US007579081B2

(12) United States Patent
Brown

(10) Patent No.: US 7,579,081 B2
(45) Date of Patent: Aug. 25, 2009

(54) OPACIFYING PARTICLES

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 437 days.

(21) Appl. No.: 11/159,038

(22) Filed: Jun. 22, 2005

(65) Prior Publication Data

US 2006/0009546 A1 Jan. 12, 2006

Related U.S. Application Data

(60) Provisional application No. 60/586,445, filed on Jul. 8, 2004.

(51) Int. Cl.
*C08K 9/06* (2006.01)
*B32B 5/16* (2006.01)
(52) U.S. Cl. .................. 428/405; 428/407; 523/201; 523/212
(58) Field of Classification Search .................. 523/212
See application file for complete search history.

(56) References Cited

U.S. PATENT DOCUMENTS

| | | | |
|---|---|---|---|
| 4,061,503 A | 12/1977 | Berger et al. | |
| 4,151,154 A * | 4/1979 | Berger | 523/203 |
| 4,421,660 A * | 12/1983 | Solc nee Hajna | 252/62.54 |
| 4,427,836 A | 1/1984 | Kowalski et al. | |
| 4,594,363 A | 6/1986 | Blankenship et al. | |
| 4,608,401 A * | 8/1986 | Martin | 523/205 |
| 4,751,171 A * | 6/1988 | Ogawa | 430/299 |
| 4,771,086 A | 9/1988 | Martin | |
| 4,818,614 A * | 4/1989 | Fukui et al. | 428/403 |
| 4,835,269 A * | 5/1989 | Kahovec et al. | 544/69 |
| 4,997,864 A * | 3/1991 | Waters | 523/319 |
| 5,041,464 A * | 8/1991 | Hoshino et al. | 521/65 |
| 5,098,698 A * | 3/1992 | Kawam et al. | 424/68 |
| RE34,145 E * | 12/1992 | Martin | 523/205 |
| 5,268,211 A * | 12/1993 | Soga et al. | 428/64.4 |
| 5,288,771 A * | 2/1994 | Takaya et al. | 523/201 |
| 5,331,025 A * | 7/1994 | Lavoie et al. | 523/437 |
| 5,338,354 A * | 8/1994 | Melville et al. | 106/442 |
| 5,431,956 A * | 7/1995 | Robb et al. | 427/220 |
| 5,631,310 A | 5/1997 | Tooley et al. | |
| 5,639,805 A * | 6/1997 | Park et al. | 523/201 |
| 5,759,255 A * | 6/1998 | Venturini et al. | 106/418 |
| 6,436,543 B1 * | 8/2002 | Endo et al. | 428/447 |
| 6,509,059 B2 * | 1/2003 | Yang et al. | 427/230 |
| 7,081,488 B2 * | 7/2006 | Bardman et al. | 523/200 |
| 7,109,256 B2 * | 9/2006 | Amano et al. | 523/212 |
| 2002/0018886 A1 * | 2/2002 | Matsufuji et al. | 428/328 |
| 2003/0012757 A1 * | 1/2003 | Barbuzzi et al. | 424/70.1 |
| 2003/0017348 A1 | 1/2003 | Brown | |
| 2004/0253443 A1 * | 12/2004 | Anselmann et al. | 428/403 |
| 2005/0154086 A1 * | 7/2005 | Yoneyama | 523/213 |
| 2005/0203211 A1 * | 9/2005 | Gebhard | 523/205 |

FOREIGN PATENT DOCUMENTS

| | | |
|---|---|---|
| EP | 1 277 766 A | 1/2003 |
| JP | 2001-98164 A * | 10/2001 |

\* cited by examiner

*Primary Examiner*—Randy Gulakowski
*Assistant Examiner*—Robert Loewe
(74) *Attorney, Agent, or Firm*—Cantor Colburn LLP

(57) ABSTRACT

An opacifying particle including a pigment particle having an average particle diameter of from 0.005 to 5 microns and an index of refraction of at least 1.8; a first polymer attached to the surface of the pigment particle via a silane residue; and a second polymer which substantially encapsulates the pigment particle having the attached first polymer is provided. Also provided is a method for forming the opacifying particle as is a coating composition and a plastic composition including the opacifying particle.

20 Claims, No Drawings

OPACIFYING PARTICLES

CROSS REFERENCE TO RELATED PATENT APPLICATIONS

This is a non-provisional application of prior U.S. Provisional Application Ser. No. 60/586,445 filed on Jul. 8, 2004.

This invention relates to opacifying particles that include certain pigments substantially encapsulated with a polymer and to a method for forming them. More specifically, the invention relates to an opacifying particle including a pigment particle having an average particle diameter of from 0.005 to 5 microns and an index of refraction of at least 1.8; a first polymer attached to the surface of the pigment particle via a silane residue; and a second polymer which substantially encapsulates the pigment particle having the attached first polymer. The invention also relates to a method for forming the opacifying particle including providing a pigment particle having an average particle diameter of from 0.005 to 5 microns and an index of refraction of at least 1.8; attaching a first polymer to the surface of the pigment particle via a silane residue; and substantially encapsulating the pigment particle having the attached first polymer with a second polymer. The invention further relates to a coating composition and a plastic including the opacifying particle.

Opacifying particles, much as certain pigments do, typically provide whiteness, and opacity, or "hiding", to coatings, such as paints, and to plastics. Such pigments are present in most coatings that are designed to conceal the substrate surface to which the coating is applied. These pigments are also present in most plastics that are designed to be totally or partially opaque. In paints and plastics, the opacifying pigment is typically present whether the paint is white or colored. It is often desirable that opacifying coatings, paints, and plastics have a high opacifying capacity so as to enable the coating or paint to completely conceal the undersurface, even if of a sharply contrasting color, while utilizing a minimal thickness of the coating or paint, or plastic. Coating, paint, and plastics manufacturers have long sought to provide coatings, paints, and plastics having the desired opacity by maximizing the level of hiding for a particular type and level of opacifying pigment. Increased hiding efficiency can be obtained by reducing the crowding of the opacifying pigment particles and minimizing the formation of clusters of opacifying pigment particles. One method to achieve this is to encapsulate the opacifying pigment particles within a polymer composition by forming a polymer on the surface of the opacifying pigment particles.

U.S. Pat. No. 4,771,086 discloses finely divided water insoluble solid particles including paint pigment particles that are given a generally uniform polymeric encapsulation by admixing the particles in an aqueous reaction medium with a water insoluble monomer polymerizable to form a generally water insoluble polymer free of ionic charges in the presence of a nonionic surfactant and effecting a redox polymerization with a redox system which is free of ionic groups. Although this process is described as providing pigment particles encapsulated in a polymeric material, the requirement that the pigment particles, polymer, and surfactants used to stabilize the monomer emulsion be substantially free of ionic charge is very limiting as to pigment and polymer composition, and surfactant choice, and makes it difficult to maintain particle stability during the polymerization. The opacifying particles of the present invention and the process for forming them avoid these shortcomings.

According to a first aspect of the present invention there is provided an opacifying particle comprising a pigment particle having an average particle diameter of from 0.005 to 5 microns and an index of refraction of at least 1.8; a first polymer attached to the surface of said pigment particle via a silane residue; and a second polymer which substantially encapsulates said pigment particle having said attached first polymer.

According to a second aspect of the present invention there is provided a method for forming an opacifying particle comprising providing a pigment particle having an average particle diameter of from 0.005 to 5 microns and an index of refraction of at least 1.8; attaching a first polymer to the surface of said pigment particle via a silane residue; and substantially encapsulating said pigment particle having said attached first polymer with a second polymer.

According to third and fourth aspect of the present invention there is provided a coating composition and a plastic comprising the opacifying particle of the first aspect of the present invention.

This invention relates to an opacifying particle including a pigment particle, the pigment particle having an average particle diameter of from 0.005 to 5 microns, preferably from 100 nm to 500 nm, and more preferably, from 200 nm to 300 nm; and an index of refraction of at least 1.8, preferably at least 1.9, and more preferably at least 2.0. The average diameter of pigment particles is typically provided by pigment particle suppliers. Indices of refraction for various pigments are well-known and are listed, for example, in "CRC Handbook of Chemistry and Physics", 80th Edition, D. R. Lide, editor, CRC Press, Boca Raton, Fla., 1999, pages 4-139 to 4-146. Suitable pigment particles include zinc oxide, antimony oxide, zirconium oxide, chromium oxide, iron oxide, lead oxide, zinc sulfide, lithopone, and titanium dioxide. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide.

The shape of the pigment particles is not critical. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The average diameter of pigment particles having nonspherical shapes are defined as their maximum dimension. The pigment particles may have a uniform composition or a heterogeneous composition with two or more phases. Certain heterogeneous pigment particles have an inner core and surrounding shell structure wherein one type of pigment forms the core and another type of pigment forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, for example, can have at least one coating of one or more of silica, alumina, zinc oxide, and zirconia. For example, certain titanium dioxide particles suitable for use in the opacifying particles of the present invention have a coating of silica and a coating of alumina.

The opacifying particle of the present invention includes a certain pigment particle as described hereinabove; a first polymer is attached to the surface of the pigment particle via a silane residue. By "attached to the surface via a silane residue" is meant herein that a silane moiety has reacted via a covalent bond-forming reaction with the accessible surface of the pigment particle and that the first polymer has become attached to the pigment particle through the reaction product of the silane with the pigment surface. "Silane" herein includes esters {Si—O—C(O)}, ethers {Si—O—C}, amines {Si—N—C}, amides {Si—N—C(O)}, silazanes {Si—N—Si}, and halides {Si—X; X=Cl, Br, I} of Silicon, as well as silanols {Si—OH}.

In one embodiment a first polymer which includes a silane moiety is used. The first polymer can be alternately a polymer with a single silane moiety, or a block copolymer with a single silane-containing block and at least one non-silane-containing block. The silane moiety or silane-containing block can be located terminal to the polymer, or within the interior of the polymer chain. It is preferred that the silane moieties be terminal to the polymer chain. The silane-functional polymer may be made as a solution polymer in a non-aqueous solvent, or as a bulk polymer. The first polymer may be made by any suitable polymerization process, such as addition polymerization of ethylenically unsaturated monomers such as acrylic, styrenic, or vinyl monomers. Polymers that contain a single silane moiety terminal to the polymer chain may be made by any known process that is capable of producing such polymers. For example, polymers containing a single terminal silane moiety may be made by the addition polymerization of ethylenically unsaturated monomers in the presence of mercaptan-functional silanes as described in U.S. Pat. No. 6,733,884. As a further example, polymers containing a single terminal silane moiety may be made by the addition polymerization of ethylenically unsaturated monomers in the presence of compounds that contain both a mercaptan group and a functional group Q, and post-reacting the polymer with a silane that contains a functional group Z, such that functional groups Q and Z react with each other to bind the silane compound to the polymer chain. Examples of complimentary functional groups Q and Z include amine groups and isocyanate groups, amine groups and isothiocyanate groups, amine groups and epoxy groups, alcohol groups and isocyanate groups, acid groups and carbodiimide groups, and amine groups and alkyl or aryl halide groups. Block copolymers that contain a single silane-containing block may be made by any known process that is capable of producing such polymers. For example, block copolymers that contain a single silane-containing block may be made by the living free radical polymerization of ethylenically unsaturated monomers wherein the monomer composition of one of the monomer feeds contains at least one silane-functional unsaturated monomer such as 3-(methacryloxy)propyltrimethoxysilane. As a further example, block copolymers that contain a silane-containing block may be made by the living free radical polymerization of ethylenically unsaturated monomers wherein the monomer composition of one of the monomer feeds contains at least one unsaturated monomer with a functional group Q, and post-reacting the polymer with a silane that contains a functional group Z, such that functional groups Q and Z react with each other to bind the silane compound to the polymer chain. Examples of complimentary functional groups Q and Z include amine groups and isocyanate groups, amine groups and isothiocyanate groups, amine groups and epoxy groups, alcohol groups and isocyanate groups, acid groups and carbodiimide groups, and amine groups and alkyl or aryl halide groups. As a further example, block copolymers that contain a silane-containing block may be made by the methods described above for making polymers with a single terminal silane moiety, wherein the compound containing the single silane moiety is replaced with a molecule containing more than one silane group. It is preferred that the silane-functional polymer have a single terminal silane group or a silane-containing block wherein the molecular weight of the silane-containing block is between 225 and 1000. It is more preferred that the silane-functional polymer have a single terminal silane group.

The silane-functional first polymers are typically prepared by the addition polymerization of ethylenically unsaturated monomers. Suitable monomers include styrene, butadiene, alpha-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various C1-C40alkyl esters of (meth)acrylic acid; for example, methyl (meth)acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate; other (meth) acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate, alkoxyalkyl (meth)acrylate, such as ethoxyethyl (meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; alcohol containing monomers such as hydroxyethyl (meth)acrylate, hydroxypropyl (meth)acrylate, hydroxybutyl (meth)acrylate; inorganic acid containing monomers such as phosphoethyl (meth)acrylate, vinyl phosphonic acid, sulfoethyl (meth)acrylate, and 2-(meth)acrylamido-2-methyl propanesulfonic acid; carboxylic acid containing monomers, such as (meth)acrylic acid, itaconic acid, fumaric acid, and maleic acid; and amine containing monomers such as dimethylamino ethyl(meth)acrylate, dimethylamino propyl(meth)acrylamide, and t-butylamino ethyl(meth)acrylate. When the silane-functional polymers contain a single terminal silane group, the polymers may have a molecular weight of 750 to 200,000, preferably from 1500 to 50,000, more preferably from 2500 to 25,000, and most preferably from 5000 to 15,000. When the silane-functional polymer is a block copolymer, the silane containing block may have a molecular weight of 225 to 10,000, more preferably from 225 to 5000, most preferably from 225 to 1000. When the silane-functional polymer is a block copolymer, the non-silane containing block(s) may have a molecular weight of 750 to 200,000, more preferably from 1500 to 50,000, more preferably from 2500 to 25,000, and most preferably from 5000 to 15,000.

In another embodiment the first polymer is attached to the surface of the pigment particle via a silane residue by performing an addition polymerization of at least one ethylenically unsaturated monomer in the presence of the pigment particles, the pigment particles having been previously modified to contain surface groups that can act as chain transfer agents for the polymerization. Such surface groups include, for example, alkyl mercaptans resulting from mercapto-functional silanes such as, for example, 3-mercaptopropyltrimethoxysilane, 3-mercaptopropyltriethoxysilane, 3-mercaptopropylmethyldimethoxysilane, or mercaptomethylmethyldiethoxysilane, and alkyl halides such as, for example, result from haloalkyl-functional silanes such as, for example, 3-(bromopropyl)trimethoxysilane, (trichloromethyl)triethoxysilane, or (3,3,3-tribromopropyl)dimethylchlorosilane. The level of the chain transfer agent may be between 0.001% to 10%, more preferably from 0.01% to 5%, most preferably from 0.1% to 2% by weight on the pigment particles. Suitable monomers for the addition polymerization and suitable molecular weights of the polymers are the same as those disclosed herein for the silane functional first polymers containing a single silane group.

In another embodiment the first polymer is attached to the surface of the pigment particle via a silane residue by performing an addition polymerization of ethylenically unsaturated monomers in the presence of the pigment particles, the pigment particles having been previously surface modified to contain surface groups that can act as initiators for the polymerization. Such surface groups include, for example, azo or peroxide groups in the case of conventional free radical polymerization, or haloalkyl groups in the case of atom transfer radical polymerization (ATRP). The surface of the pigment particles can be modified with the initiators by reaction with appropriate silane moieties; for example, the pigment particles may be reacted with azo-functional silanes such as, for example, 2,2'-azobis[2-methyl-N-(2-(3-(trimethoxysilyl) propyl urethane)ethyl)propionamide], or with peroxide-functional silanes such as, for example, di-(3-(methyldichlorosilyl)-1,1-dimethylpropyl)peroxide, or with haloalkylsilanes such as, for example, ((chloromethyl)phenyl)triethoxysilane or 3-(bromopropyl) dimethylchlorosilane. The level of the initiator may be between 0.001% to 10%, more preferably from 0.01% to 5%, most preferably from 0.1% to 2% by weight on the pigment particles. In the case of ATRP, the polymerization is catalyzed by any suitable ATRP catalysts, such as, for example, CuBr complexed with dipyridine or CuBr complexed with 1,1,4,7,10,10-hexamethyltriethylenetetramine. The catalyst level may be between 5% to 5000%, more preferably from 10% to 1000%, more preferably from 20% to 500%, most preferably from 50% to 200% of the surface-bound initiator on a molar basis. The molecular weight of the first polymer may be controlled by varying the ratio of the surface-bound initiator to the ethylenically unsaturated monomers as is well known in the art. Suitable monomers for the addition polymerization and suitable molecular weights of the polymers are the same as those disclosed herein for the silane functional first polymers containing a single silane group.

In another embodiment the first polymer contains at least one functional group F and is covalently bonded to the surface of the pigment particles by allowing the first polymer to react with the pigment particle, the pigment particles having been previously surface modified to contain surface functional groups P, where said functional groups P and F will react to form a covalent bond between the first polymer and the pigment particle. The surface of the pigment particles can be modified with the functional groups P by reaction with appropriate silane coupling agents; for example, the pigment particles may be reacted with P group-functional silanes. For example, when P is an epoxy group, the pigment particles can be reacted with an epoxysilane such as, for example, (3-glycidoxypropyl)trimethoxysilane. The level of the P-functional groups may be between 0.001% to 10%, more preferably from 0.01% to 5%, most preferably from 0.1% to 2% by weight on the pigment particles. Examples of complimentary functional groups F and P include amine groups and isocyanate groups, amine groups and isothiocyanate groups, amine groups and epoxy groups, alcohol groups and isocyanate groups, acid groups and carbodiimide groups, and amine groups and alkyl or aryl halide groups. The first polymer can be alternately a polymer with a single F group, or a block copolymer with a single F group-containing block and at least one non-F group-containing block. The F group or F group-containing block can be located terminal to the polymer, or within the interior of the polymer chain. It is preferred that the F groups be terminal to the polymer chain. The F group-functional polymer may be made as a solution polymer in water or in a non-aqueous solvent, or as a bulk polymer. The F group-containing polymer may be made by any suitable polymerization process, such as addition polymerization of ethylenically unsaturated monomers such as acrylic, styrenic, or vinyl monomers. Polymers that contain a single F group terminal to the polymer chain may be made by any known process that is capable of producing such polymers. For example, polymers containing a single terminal F group may be made by the addition polymerization of ethylenically unsaturated monomers in the presence of molecules which are both mercaptan-functional and F group functional. Block copolymers that contain a single F group-containing block may be made by any known process that is capable of producing such polymers. For example, block copolymers that contain a single F group-containing block may be made by the living free radical polymerization of ethylenically unsaturated monomers wherein the monomer composition of one of the monomer feeds contains at least one F group-functional unsaturated monomer. It is preferred that the F group-functional polymer have a single terminal F group or an F group-containing block wherein the molecular weight of the F group-containing block is between 225 and 1000. It is more preferred that the F group-functional polymer have a single terminal F group. Suitable monomers for the addition polymerization are the same as those disclosed herein for the silane functional first polymers containing a single silane group. When the F group-functional polymer contains a single terminal F group, the polymer may have a molecular weight of 750 to 200,000, preferably from 1500 to 50,000, more preferably from 2500 to 25,000, and most preferably from 5000 to 15,000. When the F group-functional polymer is a block copolymer, the F group containing block may have a molecular weight of 225 to 10,000, more preferably from 225 to 5000, most preferably from 225 to 1000. When the F group-functional polymer is a block copolymer, the non-F group containing block(s) may have a molecular weight of 750 to 200,000, more preferably from 1500 to 50,000, more preferably form 2500 to 25,000, most preferably from 5000 to 15,000.

The opacifying particle of the present invention includes a second polymer which substantially encapsulates the pigment particle having the attached first polymer. Typically, the pigment particle having the attached first polymer is dispersed in water. This dispersion step is believed to be more facile if the silane-functional first polymer, as an unattached composition, is soluble in water. The silane-functional first polymer can be made water-soluble by the inclusion of water-soluble monomers such as alcohol-functional monomers such as hydroxyethyl (meth)acrylate; amide-functional monomers such as (meth)acrylamide; acid-functional monomers such as (meth)acrylic acid, phosphoethyl (meth)acrylate, and sulfoethyl (meth)acrylate; and amine-functional monomers such as dimethylamino ethyl(meth)acrylate; or combinations thereof. The levels of these water-soluble monomers necessary to render the silane-functional first polymer water-soluble will depend on the molecular weight and nature of the co-monomers included in the composition of the silane-functional first polymer, as is understood in the art. It is preferred that the silane-functional first polymer is water soluble.

The pigment particles having attached first polymer are substantially encapsulated by the second polymer, preferably by performing an emulsion polymerization in the presence of the pigment particles. By "substantially encapsulated" herein is meant that the second polymer presents the outermost surface of at least 33%, preferably at least 50%, more preferably at least 75%, and most preferably 100%, of the surface of the opacifying particle. The emulsion polymerization can be carried out by methods known in the art including single and multiple stage polymerization processes. Various synthesis adjuvants such as initiators, chain transfer agents, and surfactants are optionally utilized in the polymerization.

The second polymer typically has a weight average molecular weight, Mw, of at least 50,000, preferably of at least 250,000, and most preferably of at least 500,000, as measured by gel permeation chromatography.

Suitable second polymers may include a single polymer phase or more than one polymer phase. Alternatively, the second polymer has a nonspherical shape such as an ellipsoid or a rod-like shape. Preferably, the second polymer forms a spherical shell encapsulating the pigment particle having the attached first polymer; the polymeric shell may have an average thickness in the range of from 5 nm to 1 micron, preferably in the range of from 50 nm to 500 nm, more preferably in the range of from 80 nm to 250 nm, and most preferably in the range of from 80 nm to 150 nm. However, for particles containing titanium dioxide as the pigment particle or other pigment particles of similar size, maximum hiding power is typically obtained with polymeric shells having average thicknesses in the range of from 40 nm to 250 nm, preferably in the range of from 60 nm to 200 nm, and more preferably in the range of from 80 nm to 150 nm.

The glass transition temperature of the second polymer is typically in the range of from $-60°$ C. to $150°$ C., as calculated using the Fox equation [*Bulletin of the American Physical Societyl,* 3 Page 123 (1956)], as follows: $1/T_g = w_1/T_{g(1)} + w_2/T_{g(2)}$. For a copolymer, w1 and w2 are the weight fraction of the two co-monomers, and Tg(1) and Tg(2) are the glass transition temperatures, in degrees Kelvin, of the two corresponding homopolymers. For polymers containing three or more monomers, additional terms (wn/Tg(n)) are added. Homopolymer Tg values are found, for example, in "Polymer Handbook", edited by J. Brandrup and E. H. Immergut, Interscience Publishers.

The second polymer is typically prepared by the addition polymerization of ethylenically unsaturated monomers such as the monomers listed hereinabove for preparation of the silane-functional first polymer. The ethylenically unsaturated monomer may include multi-ethylenically unsaturated monomer such as, for example, allyl (meth)acrylate, tripropylene glycol di(meth)acrylate, diethylene glycol di(meth) acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The particles of this invention each contain one or more pigment particles substantially encapsulated by the second polymer. It is most preferred that the particles each contain a single pigment particle, but in practice there will typically be particles containing different numbers of pigment particles, determined in part by the degree of dispersion of the pigment particles that are present at the start of the emulsion polymerization. It is preferred that a majority of the particles contain a single substantially encapsulated pigment particle.

In one embodiment opacifying particles are provided wherein the particles contain one or more pigment particles that have been reacted with a silane-functional polymer and are encapsulated by a particular second polymer including at least two polymer compositions, one polymer composition containing sufficient acid-functional monomers as to be soluble or swellable in alkaline water, another such polymer composition, located on the exterior of the particle, not being soluble or appreciably swellable in alkaline water but being permeable to base, with the swellable/soluble polymer phase being expanded inside the nonswellable/soluble polymer composition by the addition of base to create a water-filled void, such as is taught in U.S. Pat. No. 4,594,363 and 4,427,836.

The method for forming an opacifying particle of the present invention includes providing a pigment particle having an average particle diameter of from 0.005 to 5 microns and an index of refraction of at least 1.8; attaching a first polymer to the surface of the pigment particle via a silane residue; and substantially encapsulating the pigment particle having the attached first polymer with a second polymer.

Attaching a first polymer to the surface of the provided pigment particle via a silane residue includes reacting a silane-functional first polymer with a pigment particle. The reaction may be effected by any of known techniques such as those described in "Applying a Silane Coupling Agent", Silanes, Silicones and Metal-Organics, Gelest, 2000, pg 88, and references therein. Typically, the silane-functional polymer and pigment particle are reacted by combining them either in bulk or in a suitable solvent for the silane-functional polymer, and allowing the components to react for a period of from 1 minute to 1 week. The reaction may be done at a temperature of from $0°$ C. to $200°$ C., preferably from $15°$ C. to $150°$ C. Typically, the presence of water is necessary for the reaction to occur. Water may be added to the bulk mixture of silane-functional first polymer and pigment particles, or to the mixture of silane-functional first polymer in solution and pigment particles, or alternately the reaction may be done using water as the solvent for the silane-functional first polymer, or alternately the water may come from water adsorbed onto the surface of the pigment particles as generally occurs in nature. When water is added to the bulk mixture of silane-functional first polymer and pigment particles, or to the mixture of silane-functional first polymer in solution and pigment particles, generally from 0.1% to 10% water is added based on total mixture weight, although both higher and lower amounts of water addition may be used. Generally, the reaction is catalyzed by the addition of acid or base to the mixture of silane-functional first polymer, pigment particles, and optionally solvent. If the silane-functional first polymer contains acid or amine groups, then the polymer can self-catalyze the reaction. The exact time necessary to complete the reaction of the silane-functional first polymer and the pigment particles will depend on the temperature of the reaction, the nature of the solvent used, if any, and the type and concentration of acid or base catalyst used, if any.

In other embodiments attaching a first polymer to the surface of the pigment particle via a silane residue may be effected in two or more steps as detailed hereinabove.

In some embodiments the silane-functional first polymer may be reacted with the pigment particle at the same time that other surface-coatings are deposited on the surface of the pigment particle. For example, TiO2 particles often are given a silica and/or alumina surface treatment by precipitating an alkali metal silicate solution and/or an alkali metal aluminate solution onto the surface of the TiO2 from a water solution. The silane-functional polymer may be co-precipitated with the silicate and/or aluminate solutions. Alternately, the silane-functional first polymer may be reacted with the pigment particles either prior to or after any surface treatments are applied.

The weight ratio of the silane-functional first polymer to that of the pigment particles can range from 0.1% to 100%, preferably from 0.5% to 50%, more preferably from 1% to 25%. Depending on the weight ratio of the silane-functional first polymer to that of the pigment particles, as well as on the details of the reaction process, not all of the silane-functional first polymer may react with the pigment particles. Optionally, some or all unreacted silane-functional first polymer, as well as any optional organic solvent, optional acid or base catalyst, or unreacted remnants of optional surface treatments, can be removed from the first polymer-modified pigment particles by any technique suitable for separating the solid pigment particles from water or organic solvent-soluble species such as, for example, centrifugation, serum replacement via ultra filtration, or vacuum rotary filtration, prior to encapsulation via the next step.

Substantially encapsulating the pigment particle having the attached first polymer with a second polymer may be effected by performing a polymerization, preferably an emulsion polymerization, in the presence of the first-polymer-modified pigment particles. The emulsion polymerization can be carried out by methods known in the art. Emulsion polymerization techniques for preparing an aqueous dispersion of the polymer particles are well known in the polymer arts, and include multiple stage polymerization processes. Various synthesis adjuvants such as initiators, chain transfer agents, and surfactants are optionally utilized in the polymerization. In general, the emulsion polymerization is of a seeded type emulsion polymerization, with the first-polymer-modified pigment particles acting as the seeds. In one embodiment of the present invention, the reaction vessel is charged with water, first-polymer-modified pigment, and optionally surfactants and other polymerization adjuvants, and then the monomers for the second polymer are added to the kettle. In another embodiment of the present invention, the reaction vessel is charged with water, first-polymer-modified pigment, and optionally surfactants and other polymerization adjuvants, and then a part of the monomers for the second polymer is added to the kettle, and then emulsified third-polymer particles, made separately, are added, and finally the remainder of the monomer for the second polymer is added to the kettle. In yet another embodiment of the present invention, the reaction vessel is charged with water, and optionally surfactants and other polymerization adjuvants and optionally a third-polymer seed, then a part of the monomers for the second polymer is added to the kettle, then the first-polymer-modified pigment is added to the kettle, and finally the remainder of the monomer for the second polymer is added to the kettle.

The polymerization can be run as a single shot, or as multiple shots, or by continuously feeding in the monomer over time. The monomer can be added neat or emulsified in water with appropriate surfactants. Polymerization of the monomers for the second polymer can be effected by addition of polymerization initiators. The polymerization initiators may be added to the kettle prior to the monomer addition, or concurrent with the monomer addition, after the monomer addition, or as a combination of these. Examples of suitable polymerization initiators include polymerization initiators that thermally decompose at the polymerization temperature to generate free radicals. Examples include both water-soluble and water-insoluble species. Examples of suitable free radical-generating initiators include persulfates, such as ammonium and alkali metal (potassium, sodium, and lithium) persulfate; azo compounds, such as 2,2'-azobis(isobutyronitrile), 2,2'-azobis(2,4-dimethylvaleronitrile), and t-butyl azocyanocyclohexane; hydroperoxides, such as t-butyl hydroperoxide and cumene hydroperoxide; peroxides, such as benzoyl peroxide, caprylyl peroxide, di-t-butyl peroxide, ethyl 3,3'-di-(t-butylperoxy) butyrate, ethyl 3,3'-di(t-amulperoxy) butyrate, t-amylperoxy-2-ethyl hexanoate, and t-butylperoxy pivalate; peresters, such as t-butyl peracetate, t-butyl perphthalate, and t-butyl perbenzoate; as well as percarbonates, such as di(1-cyano-1-methylethyl)peroxy dicarbonate; and perphosphates. Polymerization initiators can be used alone, in mixtures, and, alternatively, as the oxidizing component of a redox system, which also includes a reducing component, such as an acid selected from the group consisting of: ascorbic acid, malic acid, glycolic acid, oxalic acid, lactic acid, and thioglycolic acid; an alkali metal sulfite, more specifically a hydrosulfite, such as sodium hydrosulfite; a hyposulfite, such as potassium hyposulfite; and a metabisulfite, such as potassium metabisulfite; and sodium formaldehyde sulfoxylate. Suitable levels of initiator and the optional reducing component include proportions of from 0.001% to 5% each, based on the weight of the monomers in the monomer mixture to be polymerized. Accelerators such as chloride and sulfate salts of cobalt, iron, nickel, and copper are generally used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II).

The aqueous reaction medium typically contains surfactant to stabilize the growing opacifying particles during polymerization and to discourage aggregation of the opacifying particles in the resulting aqueous dispersion. One or more surfactants, including anionic and nonionic surfactants, and mixtures thereof, is commonly used. Many examples of surfactants suitable for emulsion polymerization are given in *McCutcheon's Detergents and Emulsifiers* (MC Publishing Co. Glen Rock, NF), published annually. Other types of stabilizing agents, such as protective colloids, are optionally used.

Chain transfer agents are optionally added to the aqueous reaction medium to control molecular weight of the polymer matrix. Examples of chain transfer agents include mercaptans, polymercaptans, and polyhalogen compounds including alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to 10% by weight, based on the weight of the monomers in the monomer mixture, is used to prepare the second polymer.

Catalyst and/or chain transfer agent are optionally dissolved or dispersed in separate or the same fluid medium, and gradually added to the polymerization vessel. Monomer, either neat, dissolved, or dispersed in a fluid medium, is optionally added simultaneously with the catalyst and/or the chain transfer agent.

After the emulsion polymerization is complete, the opacifying particles may be provided as an aqueous dispersion, or alternately they may be provided as a solid in the form of a powder or pellet. The opacifying particles may be removed from the water from the emulsion polymerization by any appropriate technique including, for example, evaporative drying, spray drying, filtration, centrifugation, or coagulation. When the opacifying particles are provided as a solid, it is preferred that the Tg of the outer most phase of the second polymer in the case where the second polymer includes multiple phases, is above the temperature at which the opacifying particles will be stored, transported, and, optionally, processed prior to final application.

The coating composition of this invention includes the opacifying particle. The coating may also contain other materials commonly found in coatings such as pigment particles not of the present invention; extenders; binder polymers such as, for example, acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and mixtures thereof; crosslinkable polymers; polymers with reactive groups; hollow sphere polymeric pigments; solvents, coalescents, wetting agents, defoamers, rheology modifiers, crosslinkers, dyes, pearlescents, adhesion promoters, dispersants, leveling agents, optical brighteners, ultraviolet stabilizers, preservatives, biocides, and antioxidants. Such coatings include inks, paper coatings; architectural coatings, such as interior and exterior house paints, wood coatings and metal coatings; coatings for leather; textiles and nonwovens; adhesives; powder coatings; and traffic paints such as those paints used to mark roads, pavements, and runways. When the coating is a solvent-based coating, it is preferred that the polymer matrix of the polymer-encapsulated pigment particles is not substantially soluble in the solvent or mixture of solvents utilized in the coating.

The plastic of this invention includes the opacifying particle. Such plastics include pigmented acrylics, polyesters, styrenics, multiphasic polymer blends, and the like. The plastic nay also contain other materials commonly found in plastics such as pigment particles not of the present invention, extenders, other polymers, hollow sphere pigments, plasticizers, flow agents, and crosslinkers.

The coating or plastic of this invention typically includes from 1 to 50 vol % opacifying particles, preferably from 3 to 30 vol %, and more preferably from 5 to 20 vol %, based on the total volume of the coating or plastic. The coating or plastic includes from 10 to 99 vol % binder polymer, preferably from 20 to 97 vol %, and more preferably from 25 to 80 vol %, based on the total volume of the coating or plastic. The coating or plastic includes from 0 to 70 vol % extender particles, preferably from 0 to 65 vol %, and more preferably from 0 to 60 vol %, based on the total volume of the coating or plastic.

The following examples are presented to illustrate the invention and the results obtained by the test procedures.

Abbreviations g=grams; mm=millimeters; cm=centimeters; vol=volume; DI=deionized
BA=butyl acrylate
MMA=methylmethacrylate
MAA=methacrylic acid
ADE=anhydrous denatured ethanol
HEA=hydroxyethylacrylate As used herein, the term "(meth)acrylate" refers to either acrylate or methacrylate and the term "(meth)acrylic" refers to either acrylic or methacrylic.

The pigment volume concentration (PVC) of each type of pigment particles is the percentage of the volume occupied by the particles of that pigment, based on the total volume of the coating or plastic composition. For a coating or plastic containing one or more types of pigment particles, the PVC for a single type of pigment particles, Vi, is expressed by equation 1a: $V_i=100 V_{p,i}/V_c$ where $V_{p,i}$ is the volume of that single type of pigment particles and $V_c$ is the total volume c,f the coating or plastic.

Method to Determine Value of B for an Opacifying Pigment in a Coating

The B value for a particular species of pigment particles was determined by preparing a series of at least 5 coatings in which only the pigment volume concentration (PVC) of the pigment species was varied. The coatings were cast four times on Black Release Charts (Leneta Form RC-BC) with a 1.5 mil Bird blade and allowed to dry at least 16 hrs at room temperature. A rectangular area measuring 10.1 mm×8.2 mm was scribed into each drawn down coating with a knife blade, and then five Y-reflectance measurements were made with-in the inscribed area using a Pacific Scientific Colorgard 45/0 Reflectometer and the average ($Y_{ave,1.5}$) was calculated. The inscribed area of coating was peeled off of the release paper and weighted on a balance accurate to 0.0001 g. The same coatings were also cast on black scrub charts (Leneta Form P121-10N) with a 50 mil gap drawdown bar, and allowed to dry for at least 16 hrs at room temperature. The Y-reflectance ($Y_{50}$) of these thicker films was also measured with the reflectometer. The Kubelka-Munk scattering coefficient S was calculated via the equation $S=(Y_{50}/(1-Y_{50}^2))*\ln((1-Y_{ave,1.5}*Y_{50})/(1-Y_{ave,1.5}/Y_{50}))/Ft$ where $Y_{ave,1.5}$ and $Y_{50}$ are as previously defined, and Ft is the film thickness of the coating in mils, Ft being determined from the weight of the inscribed area of the coating (Wt) and the dry density (DD) of the coating via the equation Ft=4.7537*Wt/DD, where Wt is expressed in grams and DD is expressed in g/cm$^3$.

Hiding efficiency provided by a pigment in a coating or plastic is calculated from light scattering theory using the model described by Stieg in the *Official Digest*, 31 (408), 52 (1959). This model calculates the Kubelka-Munk light scattering coefficient for that pigment, Si, as a function of the PVC of the particles of that pigment, according to the equation 2: $S_i=A_i V_i(1-B_i V^{1/3}_{eff,i})$ where $A_i$ and $B_i$ are constants. A coating or plastic having a pigment that provides theoretical hiding efficiency for the particles of that pigment, has a light scattering coefficient, $S_i$, which is linearly proportional to $V_i$. In equation 2, pigment providing theoretical hiding efficiency has a $B_i$ value equal to zero. Pigment that is at least partially encapsulated in polymer is not as susceptible to crowding, has a smaller $B_i$ value, and provides more opacity than the same pigment that is not polymer-encapsulated.

Preparation of Pigment Particles Having an Average Particle Diameter of from 0.005 to 5 Microns and an Index of Refraction of at Least 1.8 with a First Polymer Attached to the Surface of the Pigment Particle Via a Silane Residue Sample 1. A 250-milliliter, three-necked round bottom flask was equipped with a magnetic stirrer, a thermometer, nitrogen inlet, and a reflux condenser. To the flask was added 86.5 g ADE, 1.16 g 3-mercaptopropyl trimethoxysilane, 8.52 g BA, 15.61 g MMA, 4.26 g MAA, and 0.15 g Vazo™ 52. The flask was purged with dry N2 then heated to a temperature of 60° C. under nitrogen, at which point the heating mantle was turned off and the reaction was allowed to exotherm to 77° C. The flask was maintained at 77° C. for 1 hr, then cooled to room temperature. The solids of the silane-functional polymer solution was 25.0%.

A grind pot was charged with 105.6 g of the silane-functional polymer solution, and then 250 g of TiPure™ R-706 (TiPure is a trademark of E.I. DuPont de Nemours and Company) was added slowly while grinding with a Premiere Mill Corp. Model 50 mill equipped with a disk blade. Grinding was continued for 10 min after addition of the TiO2 was complete, then 10 g water was added to the grind pot and grinding continued for an additional 10 min, then 0.19 g NH3 (28%) was added and grinding was continued for an additional 5 min, then 6.82 g of water and 3.0 g of NH3 (28%) was added and grinding was continued for an additional 7 min. The contents of the grind pot was transferred to a paint can and placed on a roller overnight. The TiO2 was then separated from unreacted silane-functional polymer and solvent by three centrifugation/wash cycles in which the TiO2 slurry was spun down at 5000 RPM for 30 min, the serum phase removed and the solid phase recovered and redispersed in water by adding water to the solid phase and then placing on a paint shaker for roughly 15 min. The solids of the final TiO2 slurry was 65%.

Sample 2. A 250-milliliter, three-necked round bottom flask was equipped with a magnetic stirrer, a thermometer, nitrogen inlet, and a reflux condenser. To the flask was added 86.5 g ADE, 1.16 g 3-mercaptopropyl trimethoxysilane, 8.52 g BA, 15.61 g MMA, 4.26 g MAA, and 0.2 g Vazo™ 52. The flask was purged with dry N2 then heated to 60° C. under nitrogen, at which point the heating mantle was turned off and the reaction was allowed to exotherm to 77° C. The flask was maintained at 77° C. for 1 hr, then 0.1 g of Vazo™ 52 in 2.0 g ADE was added and the mixture held at 77° C. for an additional 45 min, then cooled to room temperature. The solids of the silane-functional polymer solution was 19.0%.

A grind pot was charged with the entire silane-functional polymer solution, and then 292 g of TiPure™ R-706 was added slowly while grinding with a Premiere Mill Corp. Model 50 mill equipped with a disk blade. Grinding was continued for 10 min after addition of the TiO2 was complete, then 10 g water was added to the grind pot and grinding continued for an additional 10 min, then 5.0 g of NH3 (28%) and 5.0 g water was added and grinding was continued for an additional 5 min, then 25.0 g ADE was added and the contents of the grind pot was transferred to a paint can and placed on a roller overnight, then an additional 50.0 g ADE was added. The TiO2 was then separated from unreacted silane-functional polymer and solvent by four centrifugation/wash cycles in which the TiO2 slurry was spun down at 5000 RPM for 30 min, the serum phase removed and the solid phase recovered and redispersed by adding either ADE or water to the solid phase and then placing on a paint shaker for roughly 30 min. The solids were redispersed in ethanol after the first spin down, and in water after the second and third spin down. After the fourth spin down, the TiO2 was redispersed by placing 14.0 g of water in a grind pot and slowly adding 216.0 g of the wet solids while grinding with a Premiere Mill Corp. Model 50 mill equipped with a disk blade. Grinding was continued for 20 min after addition of the TiO2 was complete, then 15.0 g of water was added to the grind pot. The solids of the final TiO2 slurry was 73.6%.

Sample 3. A 250-milliliter, three-necked round bottom flask was equipped with a magnetic stirrer, a thermometer, nitrogen inlet, and a reflux condenser. To the flask was added 86.5 g ADE, 1.16 g 3-mercaptopropyl trimethoxysilane, 27.54 g HEA, 0.85 g MAA, and 0.15 g Vazo™ 52. The flask was purged with dry N2 then heated to 60° C. under nitrogen, at which point the heating mantle was turned off and the reaction was allowed to exotherm to 77° C. The flask was maintained at 77° C. for 1 hr, then cooled to room temperature. The solids of the silane-functional polymer solution was 24.9%.

A grind pot was charged with the entire silane-functional polymer solution, and then 200 g of TiPure™ R-706 was added slowly while grinding with a Premiere Mill Corp. Model 50 mill equipped with a disk blade. Grinding was continued for 10 min after addition of the TiO2 was complete, then 10 g water was added to the grind pot and grinding continued for an additional 10 min, then 2.0 g NH3 (28%) was added and grinding was continued for an additional 10 min, then 8.0 g water was added and the contents of the grind pot was transferred to a paint can and placed on a roller overnight. The TiO2 was then separated from unreacted silane-functional polymer and solvent by four centrifugation/wash cycles in which the TiO2 slurry was spun down at 5000 RPM for 30 min, the serum phase removed and the solid phase recovered and redispersed in water by adding water to the solid phase and then placing on a paint shaker for 30 min. The solids of the final TiO2 slurry was 65.8%.

Sample 4. A 250-milliliter, three-necked round bottom flask was equipped with a magnetic stirrer, a thermometer, nitrogen inlet, and a reflux condenser. To the flask was added 120.0 g ADE, 2.89 g 3-mercaptopropyl trimethoxysilane, 32.25 g HEA, and 0.15 g Vazo™ 52. The flask was purged with dry N2 then heated to 60° C. under nitrogen, at which point the heating mantle was turned off and the reaction was allowed to exotherm to 75° C. The flask was maintained at 75° C. for 1 hr, then temperature was raised to 78° C. and held for 30 min, then cooled to room temperature. The solids of the silane-functional polymer solution was 22.5%.

A grind pot was charged with the entire silane-functional polymer solution and 90.0 g ADE, and then 350 g of TiPure™ R-706 was added slowly while grinding with a Premiere Mill Corp. Model 50 mill equipped with a disk blade. Grinding was continued for 10 min after addition of the TiO2 was complete, then 5 g water and 1.25 g NaOH (10% in water) were added to the grind pot and grinding continued for an additional 10 min, then 5.0 g water was added and the contents of the grind pot was transferred to a paint can and placed on a roller overnight. The TiO2 was then separated from unreacted silane-functional polymer and solvent by five centrifugation/wash cycles in which the TiO2 slurry was spun down at 3500 RPM for 45 min, the serum phase removed and the solid phase recovered and redispersed in water by adding water to the solid phase and then placing on a paint shaker for roughly 60 min. The solids of the final TiO2 slurry was 66.4%.

Sample 5. A 250-milliliter, three-necked round bottom flask was equipped with a magnetic stirrer, a thermometer, nitrogen inlet, and a reflux condenser. To the flask was added 85.0 g ADE and 73.3 g polyethyleneglycol monomethylether, Mn=5000, then the temperature was raised to 90° C. The flask was purged with dry N2 then the temperature was reduced to 75° C. and 3.72 g 3-isocyanatopropyl triethoxysilane was added to the mixture and the flask was maintained at 75° C. for 1 hr, then cooled to room temperature. The solids of the silane-functional polymer solution was determined to be 50.1%. A grind pot was charged with 125 g of the silane-functional polymer solution and 105.0 g ADE, and then 385 g of TiPure™ R-706 was added slowly while grinding with a Premiere Mill Corp. Model 50 mill equipped with a disk blade. Grinding was continued for 10 min after addition of the TiO2 was complete, then 5 g water and 1.25 g NaOH (10% in water) were added to the grind pot and grinding continued for an additional 10 min, then 5.0 g water was added and the contents of the grind pot was transferred to a paint can and placed on a roller overnight. The TiO2 was then separated from unreacted silane-functional polymer and solvent by five centrifuigation/wash cycles in which the TiO2 slurry was spun down at 3500 RPM for 45 min, the serum phase removed and the solid phase recovered and redispersed in water by adding water to the solid phase and then placing on a paint shaker for roughly 60 min. The solids of the final TiO2 slurry was 63.5%.

Sample 6. A 250-milliliter, three-necked round bottom flask was equipped with a magnetic stirrer, a thermometer, nitrogen inlet, and a reflux condenser. To the flask was added 84.5 g ADE, 0.60 g 3-mercaptopropyl trimethoxysilane, 8.52 g BA, 15.61 g MMA, 4.26 g MAA, and 0.20 g Vazo™ 52. The flask was purged with dry N2 then heated to 60° C. under nitrogen, at which point the heating mantle was turned off and the reaction was allowed to exotherm to 77° C. The flask was maintained at 77° C. for 1.5 hr, then cooled to room temperature. The solids of the silane-functional polymer solution was 19.2%.

A grind pot was charged with 107.0 g water, and then 150 g Tronox™ RU-2 (Tronox is a trademark of Kerr-McGee Chemical LLC) was added slowly while grinding with a Premiere Mill Corp. Model 50 mill equipped with a disk blade. Grinding was continued for 10 min after addition of the TiO2 was complete, then 3.75 g of the silane-functional polymer solution followed by 2.5% 28% NH3 was added to the grind pot and grinding continued for an additional 15 min.

221.13 g of the TiO2 slurry was transferred to a four-necked liter round bottomed flask equipped with an overhead paddle stirrer, reflux condenser, and thermocouple. While stirring, 300.0 g water was added, then 30.4 g sodium silicate solution (200 g SiO2/liter) was added dropwise over 30 min. Then 62.0 g of the silane-functional polymer solution was added dropwise over 90 min, the temperature was raised to 90° C., and a mixture of 56.0 g water and 4.0 g concentrated H2SO4 was added dropwise over 5 hrs. After addition of the H2SO4, the temperature was maintained at 90° C. for 45 min, then the flask was cooled to room temperature; the pH was 4.5. The contents of the flask were transferred to a paint can and placed on a roller overnight, then 4.8 g 28% NH3 was added to adjust the pH to 8.5. The TiO2 was then separated from unreacted silane-functional polymer, salts, and solvent by three centrifugation/wash cycles in which the TiO2 slurry was spun down at 6000 RPM for 30 min, the serum phase removed and the solid phase recovered and redispersed in water by adding water to the solid phase and then placing on a paint shaker for roughly 30 min. The solids of the final TiO2 slurry was 63.7%.

Sample 7. A grind pot was charged with 199.0 g ethylene glycol and 6.0 g 3-mercaptopropyltrimethoxysilane, and then 300 g Ti-Pure™ R-706 was added slowly while grinding with a Premiere Mill Corp. Model 50 mill equipped with a disk blade. Grinding was continued for 10 min after addition of the TiO2 was complete, then 5 g water was added to the grind pot and grinding continued for an additional 10 min, then 1 g NH3 (28%) and 4 g water was added to the pot and grinding was continued for an additional 10 min, then 95 g ethylene glycol was added to the pot and the sample was placed on a roller for 3 days. The TiO2 was then separated from unreacted mercaptosilane and ethylene glycol by four centrifugation/wash cycles in which the TiO2 slurry was spun down at 8000 RPM for 30 min, the serum phase removed and the solid phase recovered and redispersed in ethanol by adding ADE to the solid phase and then placing on a paint shaker for 30 min. After the final washing, 265 g of TiO2 was collected and ground in a mortar and pestle until it passed a 1 mm sieve. A grind pot was then charged with 82.0 g ADE and 265 g of the mercaptosilane-modified TiO2 was added slowly while grinding with a Premiere Mill Corp. Model 50 mill equipped with a disk blade. Grinding was continued for 30 min after addition of the TiO2 was complete. Solids were 66.5%.

A 250-milliliter, three-necked round bottom flask was equipped with a overhead stirrer, a thermometer, nitrogen inlet, and a reflux condenser. To the flask was added 140 g of the slurried mercaptosilane-modified TiO2, 42 g ADE, 5.59 g BA, 10.24 g MMA, 2.79 g MAA, and 0.12 g Vazo™ 52. The flask was purged with dry N2 then heated to 60° C. under a nitrogen atmosphere, at which point the heating mantle was turned off and the reaction was allowed to exotherm to 75° C., at which point the heating mantle was turned back on and the flask was heated to 80° C. The flask was maintained at 80° C. for 30 min, then an additional 0.15 g Vazo™ 52 in 4 g ADE was added and the flask was held at 80° C. for 1 hr. 60 g ADE was added to the flask, and the contents were cooled to room temperature. The contents of the flask were poured into a can, then the flask was rinsed with 60 g of ADE and the rinse was added to the can The solids of the polymer-modified TiO2 slurry was 32.7%.

The polymer-modified TiO2 was then separated from unreacted polymer and solvent by two centrifugation/wash cycles in which the TiO2 slurry was spun down at 8000 RPM for 30 min, the serum phase removed and the solid phase recovered and redispersed in water by adding water to the solid phase and then placing on a paint shaker for 30 min. The solids of the final TiO2 slurry was 59.6%.

Sample 8. A grind pot was charged with 190.0 g ADE and 0.3 g 3-mercaptopropyl-trimethoxysilane, and then 300 g Ti-Pure™ R-706 was added slowly while grinding with a Premiere Mill Corp. Model 50 mill equipped with a disk blade. Grinding was continued for 10 min after addition of the TiO2 was complete, then 5 g water was added to the grind pot and grinding continued for an additional 10 min, then 1 g NH3 (28%) and 4 g water were added to the pot and grinding was continued for an additional 10 min, then 50 g ADE was added to the pot and the sample was placed on a roller for 3 days. The TiO2 was then separated from unreacted mercaptosilane by two centrifugation/wash cycles in which the TiO2 slurry was spun down at 8000 RPM for 30 min, the serum phase removed and the solid phase recovered and redispersed in ethanol by adding ADE to the solid phase and then placing on a paint shaker for 30 min. After the final washing, 120 g of wet TiO2/was collected and placed in a can with 90 g ADE; the can was then placed on a paint shaker for 1 hr to disperse the TiO2. Solids were 5.1.7%.

A 250-milliliter, three-necked round bottom flask was equipped with a overhead stirrer, a thermometer, nitrogen inlet, and a reflux condenser. To the flask was added 180 g of the slurried mercaptosilane-modified TiO2, 5.59 g BA, 10.24 g MMA, 2.79 g MAA, and 0.17 g Vazo™ 52. The flask was purged with dry N2 then heated to 60° C. under nitrogen, at which point the heating mantle was turned off and the reaction was allowed to exotherm to 75° C., at which point the heating mantle was turned back on and the flask was heated to 80° C. The flask was maintained at 80° C. for 30 min, then an additional 0.15 g Vazo™ 521 in 4 g ADE was added and the flask was held at 80° C. for 1 hr. 60 g ADE was added to the flask, and the contents were cooled to room temperature. The solids of the polymer-modified TiO2 slurry was 41.1%.

Sample 9. A grind pot was charged with 250.0 g anhydrous dioxane and 9.0 g 3-bromopropyltrichlorosilane, and then 300 g Ti-Pure™ R-706 was added slowly while grinding with a Premiere Mill Corp. Model 50 mill equipped with a disk blade. Grinding was continued for 20 min after addition of the TiO2 was complete, then the sample was placed in a 500 ml flask equipped with an overhead stirrer, N2-inlet, thermocouple, and reflux condenser. The flask was heated to 100° C. for 6 hrs, then the sample was transferred to a can and placed on a roller overnight. The TiO2 was then separated from unreacted brompropylsilane and dioxane by four centrifugation/wash cycles in which the TiO2 slurry was spun down at 8000 RPM for 30 min, the serum phase removed and the solid phase recovered and redispersed in ethanol by adding ADE to the solid phase and then placing on a paint shaker for 30 min. After the final washing, 250 g of TiO2 was collected and ground in a mortar and pestle until it passed a 1 mm sieve. 95 g of the modified TiO2 was placed in a can and 95 g HEA was added; the can was placed on a paint shaker for 1 hr to disperse the TiO2.

A 250-milliliter, three-necked round bottom flask was equipped with a overhead stirrer, a thermometer, nitrogen inlet, and a reflux condenser. To the flask was added the entire contents of the TiO2 slurry. With stirring, 1.15 g of 1,1,4,7,10,10-hexamethyl-triethylenetetraamine, 0.72 g CuBr, and 5 g ADE were added to the flask. The flask was purged with dry N2 then heated to a temperature of 95° C. under nitrogen, and held for 5 hrs.

Sample 10. A grind pot was charged with 130.0 g ADE and 3.5 g ((chloromethyl) phenylethyl)-trimethoxysilane, then 300 g Ti-Pure™ R-706 was added slowly while grinding with a Premiere Mill Corp. Model 50 mill equipped with a disk blade. Grinding was continued for 10 min after addition of the TiO2 was complete, then 5.0 g water and 2 drops of acetic acid were added over 5 min while grinding continued; the sample was then placed on a roller for 4 days. The sample was cleaned up via 3 centrifugation cycles using ADE after the last cycle. The TiO2 was then ground in a mortar and paestle to pass a 1 mm sieve.

A 250-milliliter, three-necked round bottom flask was equipped with a overhead stirrer, a thermometer, nitrogen inlet, and a reflux condenser. 100 g of the TiO2 above, 100 g HEA, and 20 g dioxane in a can were placed on a paint shaker for 45 min. To the flask was added 211.11 g of the TiO2/HEA/dioxane slurry. With stirring, 2.52 g of 1,1,4,7,10,10-hexamethyltriethylenetetraamine, and 1.56 g CuBr in 10 g dioxane were added to the flask. The flask was purged with dry N2 then was heated to 75° C. under nitrogen, and was held for 3 hrs. The TiO2 was then separated from unreacted monomer, dioxane, and catalyst by 3 centrifugation cycles using ethanol.

Sample 11. A grind pot is charged with 200.0 g ADE and 0.2 g (3-isothiocyanatopropyl) dimethylchlorosilane, then 300 g Ti-Pure™ R-706 is added slowly while grinding with a Premiere Mill Corp. Model 50 mill equipped with a disk blade. Grinding is continued for 20 min after addition of the TiO2 is complete. The TiO2 is then separated from unreacted silane by diafiltration. The solids are 65% A 250-milliliter, three-necked round bottom flask is equipped with a overhead stirrer, a thermometer, nitrogen inlet, and a reflux condenser. To the flask is added 86.5 g ADE, 0.40 g 2-(butylamino) ethanethiol, 8.52 g BA, 15.61 g MMA, 4.26 g MAA, and 0.15 g Vazo™ 52. The flask is purged with dry N2 then is heated to 60° C. under nitrogen, at which point the heating mantle is turned off and the reaction is allowed to exotherm to 77° C. The flask is maintained at 77° C. for 1 hr, then is cooled to room temperature. The solids of the terminal amine-functional polymer solution is 25.0%.

A 250 ml flask equipped with an overhead stirrer is charged with 153.85 g of the TiO2 slurry. With stirring, 20.0 g of the terminal amine-functional polymer solution is added. Stirring is continued for 15 min. The TiO2 is then separated from unreacted polymer and ethanol by diafiltration using water to exchange with the ethanol. The solids are 60%

EXAMPLES 1-3

Preparation of Opacifying Particles

| Material | Charge (wt) |
|---|---|
| Monomer Emulsion Feed | |
| DI Water | 15.0 |
| Sodium Dodecylbenzene Sulfonate (23%) | 0.93 |
| Methyl Methacrylate | 33.74 |

-continued

| Material | Charge (wt) |
|---|---|
| Butyl Acrylate | 35.52 |
| DI Water Rinse | 7.0 |
| In Process Monomer Emulsion Additive | |
| Methacrylic Acid | 1.78 |
| Sodium Dodecylbenzene Sulfonate (23%) | 0.3 |

EXAMPLE 1

62.4 g DI water was heated under mild agitation to 45° C. in a 500 ml four-neck flask under N$_2$ blanket. 72.7 g of Sample 1 was charged to the kettle followed by a 5 g DI water rinse. After two minutes, a premixed solution of 2.8 g 0.15% FeSO4*7H2O and 2.5 g of 1% ethylenediamine tetraacetic acid (EDTA) was charged. Immediately thereafter, gradual additions of the following initiator components were begun:

0.49 g 70% t-butyl hydroperoxide in 25 g DI water
0.31 g Isoascorbic Acid in 25 g DI water.

After a two minute delay, the gradual addition of the Monomer Emulsion was started. At 30 minutes into the monomer emulsion feed, the in-process monomer emulsion additives (MAA and sodium dodecylbenzene sulfonate) were added under good agitation. The pH of the monomer emulsion was then adjusted to 6.5-7.0 with 29% ammonia.

All feeds were allowed to continue to completion. The batch was held at 44-46° C. throughout. The total initiator solutions feed time was approximately 85 minutes and the monomer emulsion addition feed time was about 80 minutes in duration. When all feeds were ended, the batch was held at temperature for 10 minutes. Then 0.09 g 70% tBHP in 1.5 g DI water was added followed immediately by the addition of 0.06 g isoascorbic acid in 1.5 g DI water. After a 10 minute hold, 0.09 g 70% tBHP in 1.5 g DI water was added followed by the addition of 0.06 g isoascorbic acid. The batch was held for an additional 15 minutes and ihen air cooled to room temperature. The pH of the batch was adjusted with 29% ammonia. The batch was filtered and packaged immediately and placed on a roller to prevent settling. The % total solids of the batch was 38.8, the final pH was 8.1 and the particle size was 502 nm as measured by Brookhaven BI-90.

EXAMPLE 2

50.5 g DI water was heated under mild agitation to 45° C. in a 500 ml four-neck flask under N$_2$ blanket. 41.4 g of Sample 2 was charged to the kettle followed by a 5 g DI water rinse. After two minutes, a premixed solution of 2.8 g 0.15% FeSO4*7H2O and 2.5 g of 1% ethylenediamine tetraacetic acid (EDTA) was charged. Immediately thereafter, gradual additions of the following initiator solutions were begun:

0.49 g 70% t-butyl hydroperoxide in 25 g DI water
0.31 g Isoascorbic Acid in 25 g DI water.

After a two minute delay, the gradual addition of the Monomer Emulsion was started. At about 30 minutes into the monomer emulsion feed, the in-process monomer emulsion additives (MAA and sodium dodecylbenzene sulfonate) were added under good agitation. The pH of the monomer emulsion was then adjusted to 6.5-7.0 with 29% ammonia. All feeds were allowed to continue to completion. The batch temperature was held at 44-46° C. throughout. The total initiator solution feed time was approximately 85 minutes and the monomer emulsion addition feed time was about 80 minutes. When all feeds were ended, the batch was held at temperature for 10 minutes. Then 0.09 g 70% tBHP in 1.5 g DI water was added immediately by the addition of 0.06 g isoascorbic acid in 1.5 g DI water. After a 10 minute hold, 0.09 g 70% tBHP in 1.5 g DI water was added followed by the addition of 0.06 g isoascorbic acid. The batch was held for an additional 15 minutes and then air cooled to room temperature. The pH of the batch was adjusted with 29% ammonia. The batch was filtered and packaged immediately and placed on a roller to prevent settling. The % total solids of the batch was 37.8, the final pH was 8.4 and the particle size was 545 nm as measured by Brookhaven BI-90.

EXAMPLE 3

87.2 g DI water was heated under mild agitation to 45° C. in a 500 ml four neck flask under $N_2$ blanket. 51 g of Sample 7 was charged to the kettle followed by a 5 g DI water rinse. After two minutes, a premixed solution of 2.8 g 0.15% FeSO4*7H2O and 2.5 g of 1% ethylenediamine tetraacetic acid (EDTA) was charged. Immediately thereafter, gradual additions of the following initiator solutions were begun at 0.2 ml/min:

0.49 g 70% t-butyl hydroperoxide in 25 g DI water
0.31 g Isoascorbic Acid in 25 g DI water.

After a two minute delay, the gradual addition of the Monomer Emulsion was started at a feed rate of 0.71 ml/min. At 20 minutes into the monomer emulsion feed, 0.3 g 23% sodium dodecylbenzene sulfonate was added to the monomer emulsion under good agitation. At 30 minutes into the monomer emulsion feed, 1.1 g 14% ammonia was charged to the cofeed t-BHP solution and mixed thoroughly. At 35 minutes into the monomer emulsion feed, 1.78 g MAA was added to the monomer emulsion under good agitation. All feeds were allowed to continue to completion. The batch temperature was held at 44-46° C. throughout. The pH of the batch was maintained at 6-7 by adding aliquots of 7% ammonia. The total gradual addition time was 120 minutes. When all feeds were ended, the batch was held at temperature for 10 minutes. Then 0.09 g 70% tBHP in 1.5 g DI water was added followed immediately by the addition of 0.06 g isoascorbic acid in 1.5 g DI water. After a 10 minute hold, 0.09 g 70% tBHP in 1.5 g DI water was added followed by the addition of 0.06 g isoascorbic acid. The batch was held for an additional 15 minutes and then air cooled to room temperature. The pH of the batch was adjusted with 29% ammonia. The batch was filtered and packaged immediately and placed on a roller to prevent settling. The % total solids of the batch was 30.6, the final pH was 8.1 and the particle size was 504 nm as measured by Brookhaven BI-90.

COMPARATIVE EXAMPLE A 125 g TiPure™ R-706 in 125 g DI H2O was dispersed for ten minutes using a Premiere Mill Corp. Model 50 mill equipped with a disk blade. The slurry was removed from the mill and 2.72 g 23% DS-4 diluted with 22.29 g DI water was added. The material was placed on a lab sonicator prior to its use in the following emulsion polymerization.

| Material | Charge (wt) |
| --- | --- |
| Monomer Emulsion Feed | |
| DI Water | 59 |
| Sodium Dodecylbenzene Sulfonate (23%) | 2.44 |
| Methyl Methacrylate | 97.50 |

-continued

| Material | Charge (wt) |
| --- | --- |
| Butyl Acrylate | 84.38 |
| Methacrylic Acid | 1.78 |
| DI Water Rinse | 19 |
| In-Process Monomer Emulsion Additive | |
| Sodium Dodecylbenzene Sulfonate (23%) | 2.44 |

230 g DI water was heated under mild agitation to 62° C. in a 500 ml four-neck flask under $N_2$ blanket. 260 g TiO2 Slurry described above was charged to the kettle followed by a 45 g DI water rinse. After two minutes, 7.0 g of 0.15% FeSO4*7H2O was charged. Immediately thereafter, gradual additions of the following initiator solutions were begun at 0.51 ml/min each:

1.23 g 70% t-butyl hydroperoxide in 25 g DI water
0.78 g Isoascorbic Acid in 25 g DI water.

After a two minute delay, the gradual addition of the Monomer Emulsion was started at 2.9 ml/min. At 30 minutes into the monomer emulsion feed, much loose gel was observed. 100 g DI water was added to the kettle to dilute the batch. The in-process monomer emulsion additive (sodium dodecylbenzene sulfonate) was added to the monomer emulsion under good agitation and all feeds were continued. At 45 minutes into feed, the loose and adhered gel was excessive and the batch was aborted.

EXAMPLE 4

Preparation and Evaluation of Coatings Composition Including Opacifying Particle A coating (4.1) containing 15.65 PVC of TiO2 was prepared by combining, while stirring with an overhead bench top lab stirrer, 100.00 g of Example 1, 1.68 g Texanol™ (TEXANOL is a trademark of Eastman Chemical Co.), 0.25 g water, and 0.40 g of Natrosol™ 250 HR.

A coating (4.2) containing 0 PVC of TiO2 was prepared by combining, while stirring with an overhead bench top lab stirrer 54.34 g of Rhoplex™ AC-261 (RHOPLEX is a trademark of Rohm and Haas Co.), 1.95 g Texanol™, 30.19 g water, and 0.50 g of Natrosol™ 250 HR.

Coatings with intermediate TiO2 PVCs were prepared by mixing the following amounts of the two previous coatings:

| Coating | Coating TiO2 PVC | weight coating 4.2 | weight of coating 4.1 |
| --- | --- | --- | --- |
| 4.3 | 2.5 | 21.93 g | 4.80 g |
| 4.4 | 5 | 17.76 g | 9.59 g |
| 4.5 | 7.5 | 13.59 g | 14.39 g |
| 4.6 | 10 | 9.42 g | 19.18 g |
| 4.7 | 12.5 | 5.25 g | 23.98 g |

The B value was determined to be 0.00, which, compared to the known B value for un-encapsulated TiPure™ R-706 of 0.23, shows that the opacifying particles of the present invention are less prone to a loss in hiding efficiency due to pigment crowding than the state of the art pigment.

EXAMPLE 5

Preparation and Evaluation of Coatings Composition Including Opacifying Particle A coating (5.1) containing 7.25 PVC of TiO2 was prepared by combining, while stirring with an overhead bench top lab stirrer, 102.17 g of Example 2, 1.95 g Texanol™, and 0.40 g of Natrosol™ 250 HR.

A coating (5.2) containing 0 PVC of TiO2 was prepared by combining while stirring with an overhead bench top lab stirrer 60.75 g of Rhoplex™ AC-261, 2.16 g Texanol™, 31.64 g water, and 0.40 g of Natrosol™ 250 HR.

Coatings with intermediate TiO2 PVCs were prepared by mixing the following amounts of the two previous coatings:

| Coating | Coating TiO2 PVC | weight of coating 5.2 | weight of coating 5.1 |
|---|---|---|---|
| 5.3 | 1.48 | 17.40 g | 4.69 g |
| 5.4 | 2.95 | 13.05 g | 9.38 g |
| 5.5 | 4.40 | 8.70 g | 14.07 g |
| 5.6 | 5.83 | 4.35 g | 18.76 g |

The B value was determined to be 0.03, which, compared to the known B value for un-encapsulated TiPure™ R-706 of 0.23, shows that the polymer-encapsulated pigment particles of the present invention are less prone to a loss in hiding efficiency due to pigment crowding than the state of the art pigment.

I claim:
1. An opacifying particle comprising
   a pigment particle having an average particle diameter of from 0.005 to 5 microns and an index of refraction of at least 1.8;
   a first polymer attached to the surface of the pigment particle via a silane residue, wherein the first polymer is an addition polymer of at least one ethylenically unsaturated monomer; and
   a shell comprising a second polymer, the second polymer being formed from at least one ethylenically unsaturated monomer comprising at least one water-soluble monomer selected from the group consisting of an ethylenically unsaturated alcohol-functional monomer, an ethylenically unsaturated inorganic acid-functional monomer, an ethylenically unsaturated carboxylic acid-functional monomer, an ethylenically unsaturated amide-functional monomer, an ethylenically unsaturated amine-functional monomer, and a combination thereof, which substantially encapsulates the pigment particle having the attached first polymer.

2. The opacifying particle of claim 1, wherein the pigment particle comprises titanium dioxide.

3. The opacifying particle of claim 1, wherein the first polymer is an addition polymer comprising one or more C1-C40 alkyl esters of (meth)acrylic acid in polymerized form, and the silane residue is derived from an alkylmercapto-functional silane or a haloalkyl-functional silane.

4. The opacifying particle of claim 3, wherein the first polymer is further formed from at least one water-soluble monomer selected from the group consisting of an ethylenically unsaturated inorganic acid-functional monomer, an ethylenically unsaturated carboxylic acid-functional monomer, an ethylenically unsaturated amine-functional monomer, and combinations thereof.

5. The opacifying particle of claim 4, wherein the C1-C40 alkyl ester of (meth)acrylic acid is selected from the group consisting of methyl (meth)acrylate, ethyl (meth)acrylate, butyl (meth)acrylate, 2-ethylhexyl(meth)acrylate, hydroxyethyl (meth)acrylate, hydroxypropyl (meth)acrylate, and a combination thereof;
   the silane residue is derived from 3-mercaptopropyltrimethoxysilane, 3-mercaptopropyltriethoxysilane, 3-mercaptopropylmethyldimethoxysilane, 3-mercaptopropylmethyldiethoxysilane, 3-(bromopropyl)trimethoxysilane, (trichloromethyl)triethoxysilane, (3,3,3-tribromopropyl)dimethylchlorosilane, ((chloromethyl)phenylethyl)-trimethoxysilane, and a combination thereof; and
   the water soluble monomer in the first polymer is selected from the group consisting of phosphoethyl (meth)acrylate, vinyl phosphonic acid, sulfoethyl (meth)acrylate, 2-(meth)acrylamido-2-methyl propanesulfonic acid, (meth)acrylic acid, itaconic acid, fumaric acid, maleic acid, dimethylaminoethyl (meth)acrylate, dimethylaminopropyl (meth)acrylamide, t-butylaminoethyl (meth) acrylatet, and a combination thereof.

6. The opacifying particle of claim 1, wherein the layer of the second polymer forms a shell having has an average thickness of 5 nanometers to 150 nanometers.

7. A coating composition comprising the opacifying particle of claim 1.

8. A plastic composition comprising the opacifying particle of claim 1 and one or more plastics.

9. The opacifying particle of claim 1, wherein the at least one water soluble monomer in the second polymer is selected from the group consisting of an inorganic acid containing monomer, a carboxylic acid containing monomer, an amine containing monomer, and a combination thereof.

10. The opacifying particle of claim 9, wherein the water soluble monomer in the second polymer is selected from the group consisting of phosphoethyl (meth)acrylate, vinyl phosphonic acid, sulfoethyl (meth)acrylate, 2-(meth)acrylamido-2-methyl propanesulfonic acid, (meth)acrylic acid, itaconic acid, fumaric acid, maleic acid, dimethylaminoethyl (meth) acrylate, dimethylamino-propyl (meth)acrylamide, and t-butylamino ethyl (meth)acrylate, and a combination thereof.

11. The opacifying particle of claim 10, wherein the water soluble monomer in the second polymer is selected from the group consisting of acrylic acid, methacrylic acid, and a combination thereof.

12. An opacifying particle comprising
   a titanium dioxide particle having an average particle diameter of from 0.005 to 5 microns and an index of refraction of at least 1.8;
   a first polymer attached to the surface of the pigment particle via a silane residue, wherein
      the first polymer is formed from a C1-C40 alkyl ester of (meth)acrylic acid selected from the group consisting of methyl (meth)acrylate, ethyl (meth)acrylate, butyl (meth)acrylate, 2-ethylhexyl(meth)acrylate, hydroxyethyl (meth)acrylate, hydroxypropyl (meth) acrylate, and a combination thereof, and
      an water soluble monomer selected from the group consisting of phosphoethyl (meth)acrylate, vinyl phosphonic acid, sulfoethyl (meth)acrylate, 2-(meth) acrylamido-2-methyl propanesulfonic acid, (meth) acrylic acid, itaconic acid, fumaric acid, maleic acid, dimethylaminoethyl (meth)acrylate, dimethylaminopropyl (meth)acrylamide, 1-butylaminoethyl (meth) acrylate, and a combination thereof;

the silane residue is derived from the group consisting of 3-mercaptopropyltrimethoxysilane, 3-mercaptopropyltriethoxysilane, 3-mercaptopropylmethyldimethoxysilane, 3-mercaptopropylmethyldiethoxysilane, 3-(bromopropyl)trimethoxysilane, (trichloromethyl)triethoxysilane, (3,3,3-tribromopropyl)dimethylchlorosilane, ((chloromethyl)phenylethyl)-trimethoxysilane, and a combination thereof; and a shell substantially encapsulating the pigment particle having the attached first polymer, and comprising a second polymer, wherein the second polymer is formed from at least one water soluble monomer selected from the group consisting of an ethylenically unsaturated inorganic acid-functional monomer, an ethylenically unsaturated carboxylic acid-functional monomer, or a combination thereof; and one or more C1-C40 alkyl esters of (meth)acrylic acid selected from the group consisting of methyl (meth)acrylate, ethyl (meth)acrylate, butyl (meth)acrylate, 2-ethylhexyl(meth)acrylate, hydroxyethyl (meth)acrylate, hydroxypropyl (meth)acrylate, and a combination thereof.

13. A coating composition comprising the opacifying particle of claim 12.

14. A plastic composition comprising the opacifying particle of claim 12 and one or more plastics.

15. A method for forming an opacifying particle comprising providing a pigment particle having an average particle diameter of from 0.005 to 5 microns and an index of refraction of at least 1.8;

attaching a first polymer to the surface of the pigment particle via a silane residue, wherein the first polymer is an addition polymer of at least one ethylenically unsaturated monomer: and emulsion polymerizing at least one ethylenically unsaturated water-soluble monomer selected from the group consisting of an alcohol-functional monomer, an inorganic acid- functional monomer: a carboxylic acid-functional monomer, an amide-functional monomer, an amine-functional monomer, and combinations thereof in the presence of the pigment particle having the attached first polymer, to form a shell comprising a second polymer substantially encapsulating the pigment particle having the attached first polymer.

16. The method of claim 15, wherein the attaching the first polymer to the surface of the pigment particle via a silane residue is effected in the presence of an alkali silicate solution or an alkali aluminate solution.

17. The method of claim 15, wherein the pigment particle comprises titanium dioxide, the first polymer is an addition polymer comprising one or more C1-C40 alkyl esters of (meth)acrylic acid, in polymerized form, and the silane residue is derived from an alkylmercapto-functional silane or a haloalkyl-functional silane.

18. The method of claim 17, wherein the first polymer is further formed from at least one water soluble monomer selected from the group consisting of an ethylenically unsaturated alcohol-functional monomer, ethylenically unsaturated inorganic acid-functional monomer, an ethylenically unsaturated carboxylic acid-functional monomer, an ethylenically unsaturated amide-functional monomer, an ethylenically unsaturated amine-functional monomer, and combinations thereof.

19. The method of claim 18, wherein the C1-C40 alkyl ester of (meth)acrylic acid is selected from the group consisting of methyl (meth)acrylate, ethyl (meth)acrylate, butyl (meth)acrylate, 2-ethylhexyl(meth)acrylate, hydroxyethyl (meth)acrylate, hydroxypropyl (meth)acrylate, and a combination thereof;

the silane residue is derived from 3-mercaptopropyltrimethoxysilane, 3-mercaptopropyltriethoxysilane, 3-mercaptopropylmethyldimethoxysilane, 3-mercaptopropylmethyldiethoxysilane, 3-(bromopropyl)trimethoxysilane, (trichloromethyl)triethoxysilane, (3,3,3-tribromopropyl)dimethylchlorosilane, ((chloromethyl)phenylethyl)-trimethoxysilane, and a combination thereof; and the water soluble monomer in the first polymer is selected from the group consisting of phosphoethyl (meth)acrylate, vinyl phosphonic acid, sulfoethyl (meth)acrylate, 2-(meth)acrylamido-2-methyl propanesulfonic acid, (meth)acrylic acid, itaconic acid, fumaric acid, maleic acid, dimethylaminoethyl (meth)acrylate, dimethylaminopropyl (meth)acrylamide, t-butylaminoethyl (meth)acrylate, and a combination thereof.

20. The method of claim 15, wherein the layer of the second polymer forms a shell having has an average thickness of 5 nanometers to 150 nanometers.

\* \* \* \* \*

UNITED STATES PATENT AND TRADEMARK OFFICE
CERTIFICATE OF CORRECTION

PATENT NO.       : 7,579,081 B2                                   Page 1 of 1
APPLICATION NO.  : 11/159038
DATED            : August 25, 2009
INVENTOR(S)      : Ward Thomas Brown It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Fourteenth Day of September, 2010

David J. Kappos
*Director of the United States Patent and Trademark Office*